United States Patent [19]

Jensen

[11] Patent Number: 5,782,624
[45] Date of Patent: Jul. 21, 1998

[54] FLUID COMPRESSION/EXPANSION MACHINE WITH FLUTED MAIN ROTOR HAVING RULED SURFACE ROOT

[76] Inventor: David L. Jensen, 5107 Glengate Rd., Rochester, Mich. 48306

[21] Appl. No.: 738,087

[22] Filed: Oct. 25, 1996

Related U.S. Application Data

[60] Provisional application No. 60/007,153, Nov. 1, 1995.

[51] Int. Cl.$^6$ .................................... F01C 3/08
[52] U.S. Cl. ........................................ 418/195
[58] Field of Search ........................ 418/195, 196, 418/220

[56] References Cited

U.S. PATENT DOCUMENTS

| | | | |
|---|---|---|---|
| 3,133,695 | 5/1964 | Zimmern | 418/195 |
| 3,932,077 | 1/1976 | Zimmern | 418/195 |
| 3,945,778 | 3/1976 | Zimmern | 418/195 |
| 4,036,567 | 7/1977 | Sato | 418/105 |
| 4,179,250 | 12/1979 | Patel | 418/195 |
| 5,129,800 | 7/1992 | Boblitt | 418/195 |

OTHER PUBLICATIONS

"Curves and Surfaces for Computer Aided Geometric Design, A Practical Guide", Gerald Farin, Academic Press, Inc., 1988, pp. 256–257.

*Primary Examiner*—John J. Vrablik
*Attorney, Agent, or Firm*—Reising, Ethington, Learman & McCulloch, PLLC

[57] ABSTRACT

Fluid compressor or expander having a main rotor with discrete arcked-helical flutes that have ruled surface roots that match the predominantly planar tips of the teeth of the associated gate rotors and provide effective fluid sealing as the gate rotor teeth sweep through the flutes of the main rotor during compressor or expander operation. The flutes can be readily and economically made by end milling, in which a first flute is milled with a minimized number of milling passes such as a first pass to make one arcked-helical flank and a portion of the arcked-helical root of a first flute and a second pass to make the opposing arcked-helical flank and another portion of the arcked-helical root of the first flute. Additional discrete flutes are made in a similar manner until the main rotor is completed.

9 Claims, 6 Drawing Sheets

FLUID COMPRESSION/EXPANSION MACHINE WITH FLUTED MAIN ROTOR HAVING RULED SURFACE ROOT

Applicant hereby incorporates by reference Provisional application Ser. No. 60/007,153 filed Nov. 1, 1995, entitled "SINGLE ROTOR COMPRESSOR DESIGN WITH MAIN ROTOR AND GATE ROTORS WITH FLAT TIP MATING SURFACES".

FIELD OF THE INVENTION

This invention relates to rotary fluid machines, and more particularly, to single screw fluid compressors and expanders featuring new and improved main rotor flute and gate rotor tooth designs and further to a new and improved method of manufacturing main rotor flutes.

BACKGROUND OF THE INVENTION

Fluid machines such as fluid compressors or expanders of the single screw type, also known as monoscrew or globoid types, are well known in the art. The single screw of such machines comprises one main rotor usually working with a pair of gate rotors. The main rotor typically has six helical-like flutes each with a globoid or hourglass root profile. The gate rotors each typically have a plurality of radially spaced gating teeth and are located on opposite sides of the main rotor and mesh with the flutes. When the main rotor is rotatably driven, the meshing side rotors are driven thereby and cooperate therewith to displace the fluid fed into the rotor flutes while changing the volume thereof. In the case of compressors having such main and gate rotors in air conditioning or refrigeration systems, the vaporized refrigerant is compressed and transmitted as a high temperature and high pressure vapor to the condenser.

Most present single screw compressor designs use a circular arc for the tips of the gate rotor teeth which requires that the mating root of the flute in the main rotor be concavely curved. Representative examples of such designs are disclosed in U.S. Pat. Nos. 4,179,250, issued Dec. 18, 1979, and U.S. Pat. NO. 4,036,567, issued Jul. 19, 1977, in which the gate rotor tooth tips and matching main rotor roots of the fluid conducting flutes therein are oppositely curved so that they mate together for fluid sealing purposes.

As noted in prior U.S. Pat. No. 3,133,695, issued May 19, 1964, the forming of the threads of the main rotor of prior compressors involves complex manufacturing problems. Among the drawbacks of such prior designs is that the double curvature of the roots of the helical-like flutes of the single screw or main rotor makes them difficult to manufacture with the desired minimal clearance necessary for effective fluid sealing with the gate rotor tips throughout their sweep of the main rotor flutes. Such tight tolerance sealing was obtained with laborious and demanding manufacturing procedures. Prior designs accordingly were limited in application particularly where quantity production is needed.

More particularly, the manufacture of compressors with such prior art main rotor flute designs is expensive primarily because of the high cost of the many required passes of a cutting tool along the surfaces of a blank or starting part and then precision hand finishing and/or lapping of the surfaces until a suitable rotor is produced.

Also, special machines that use special cutting tools that mimic the shape of the gate rotor geometry and the combined motions of the main and gate rotors are often required. These highly specialized machine tools must make many passes, as the flutes are cut with a small incremental removal of material from the starting blank with each pass. Even after such special machining the finishing of the flutes requires laborious and costly polishing and/or lapping.

U.S. Pat. No. 3,945,778, issued Mar. 23, 1976, discloses another prior art main rotor design with flutes having slanted or inclined rectilinear roots mating with the slanted tips of the gate rotor teeth. Such slanted root designs still cannot be efficiently or effectively manufactured particularly with a few passes of an end mill. Such complex slanted roots, especially those involving an acute angle between the flanks and roots of the flutes, involve manufacturing by the same multi-pass procedures involved in making the other prior art main rotors referenced above, or may even require more complex processes.

SUMMARY OF THE INVENTION

The present invention is drawn to rotary screw compressors and expanders in which a main rotor has a plurality of discrete arcked-helical flutes machined or otherwise formed therein. Each of the flutes features spaced flanking sides and a root with a moving straight line fluid sealing area, which is generally perpendicular to the flanking sides, for cooperative sealing with the predominantly flat tips of the cooperative gate rotor teeth. Each of these roots may be described as a ruled surface, which is a straight line segment moved through space along a predetermined path, in this case in an arcked-helical path through the material of the main rotor with respect to its longitudinal axis.

Preferably, such flutes of the rotor of this invention are economically and efficiently end milled into a rotor blank or pre-formed part. In one featured procedure each flute is end milled in two passes with a first pass forming one side or flank of a flute and a portion of the root and a second pass forming the other side or flank of the flute and the remaining portion of the root. In another featured procedure the sides of each flute are end milled in separate passes while the root is milled in a third pass to complete the flute.

In any event, with the roots of the flutes being ruled surfaces, having an infinite number of continuous straight-lined rulings or sealing areas that match and cooperate with the predominantly straight-line tips of the gate rotor teeth, fluid sealing between the main and gate rotors is enhanced to improve the operation of the rotary fluid machine.

Another feature and object of the present invention is to provide a single screw rotary fluid machine for varying the volume of a fluid medium supplied thereto that incorporates a new and improved high tolerance fluid seal between the cooperating rotors thereof which is easily and economically manufactured.

An additional feature and object of the invention is to provide a new and improved rotary fluid machine that includes a main drive rotor with a plurality of discrete arcked-helical flutes that have ruled root surfaces and an associated gate rotor having teeth which mesh with the flutes and which terminate in tips that are predominantly planar and co-act with the root surface to provide predominantly planar moving regions of high tolerance fluid sealing when the rotors turn to move fluid through the machine.

A further feature and object of the present invention is to provide a new and improved fluid machine with a main rotor having arcked-helical flutes having roots that have an infinite number of straight-line sealing segments between the flanks of the flutes which are predominantly perpendicular to the axis of the incoming straight tipped teeth of an associated gate rotor such that the flutes in the main rotor can be milled at a single station with a limited number of passes of an end milling machine.

Another feature and object of this invention is to provide a new and improved and economical method of making a fluted main rotor for a rotary fluid machine that has at least one gate rotor with similar radial gating teeth that have predominantly flat straight-line tips. The starting part for the main rotor is milled so that the roots of the flutes have an infinite number of straight line fluid sealing segments that cooperate with the straight-line tips of the gating teeth sweeping therethrough to provide substantially straight line fluid sealing in the rotary machine.

In one preferred method the starting blank or preformed part is milled in a first pass to form an arcked-helical flank and associated arcked-helical portion of the root of a first flute. Subsequently, an opposing arcked-helical side flank and a further portion of said arcked-helical root is milled in the starting part to form a first flute with a root having straight-line fluid sealing for the flat tips of the gate rotor teeth. The straight-line sealing is in the plane of the gate rotor. In a similar manner additional flutes are milled into the starting part until the main rotor is completed.

A further milling method in another preferred embodiment allows the first two passes to mill mainly the side flanks with the root subsequently being primarily milled in a third pass.

Further features, objects and advantages of the present invention become more apparent from the following description and drawings.

DETAILED DESCRIPTION OF THE DRAWINGS

Figure 1:
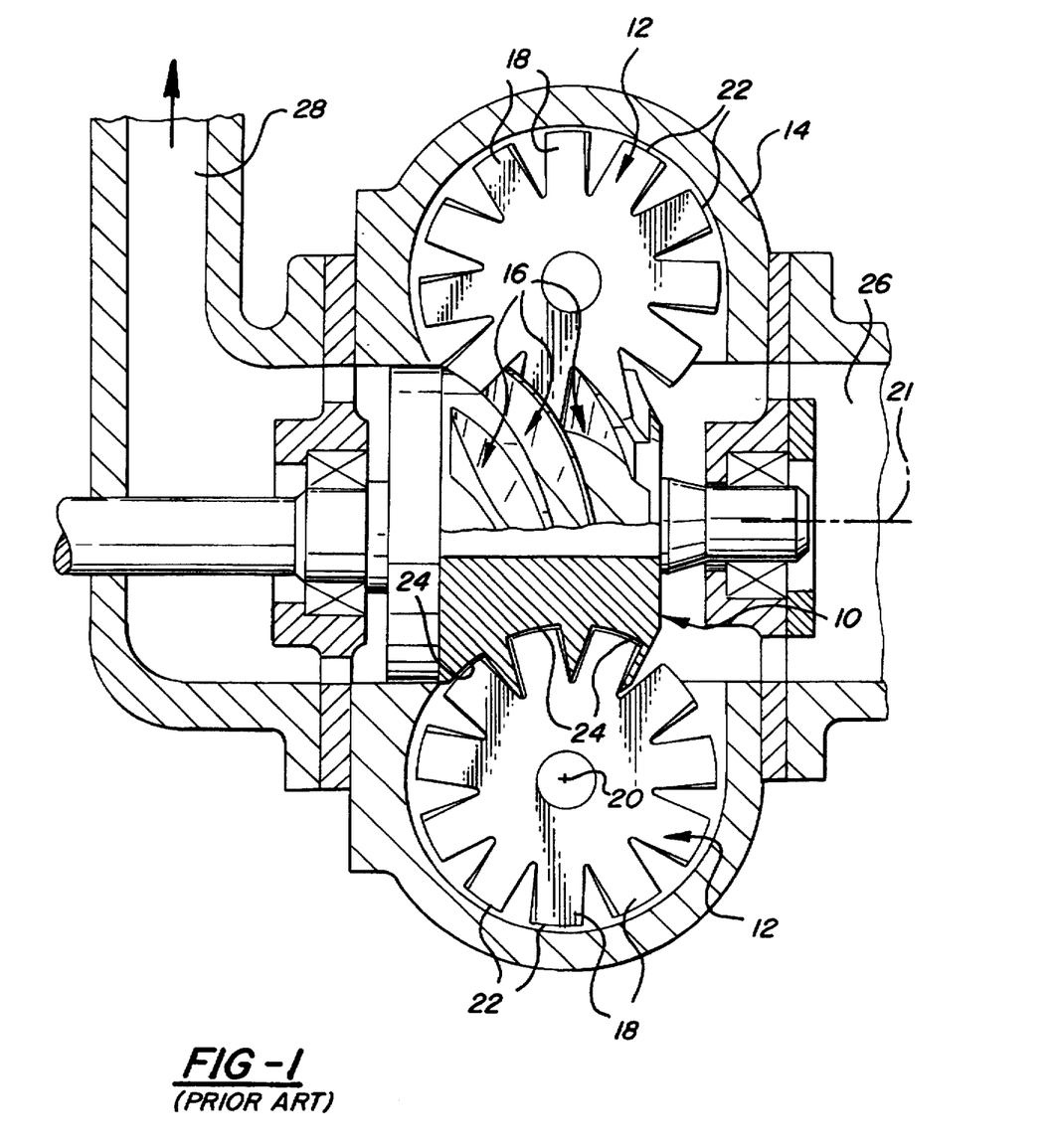
FIG. 1 is a top view, partly in section, of a prior art single screw compressor.

The general arrangement of one prior art single screw compressor, often referenced as a "Globoid worm" type is shown in FIG. 1. This compressor includes a main rotor 10 and a pair of gate rotors 12 operatively mounted in housing 14. The main rotor has flutes 16 formed in the body thereof which mesh with the teeth 18 of the gate rotors 12 that extend radially outward from their rotational axes 20 on opposite sides of the rotational axis 21 of the main rotor. The gate rotor teeth 18 have rounded or circular tips 22 that mate with the oppositely curved roots 24 of the flutes of the main rotor 10 extending between the flanks or sides of the flutes 16.

The general function of the compressor is to compress fluid that is fed into the chambers defined by the flutes and meshing gate rotor teeth. The fluid enters through an inlet generally indicated at 26 and exits through a discharge generally indicated at 28. As the gate rotor teeth 18 sweep through the flutes 16, a moving fluid seal is formed therebetween and the fluid in the chambers is compressed and forced into the outlet 28.

Figure 2:
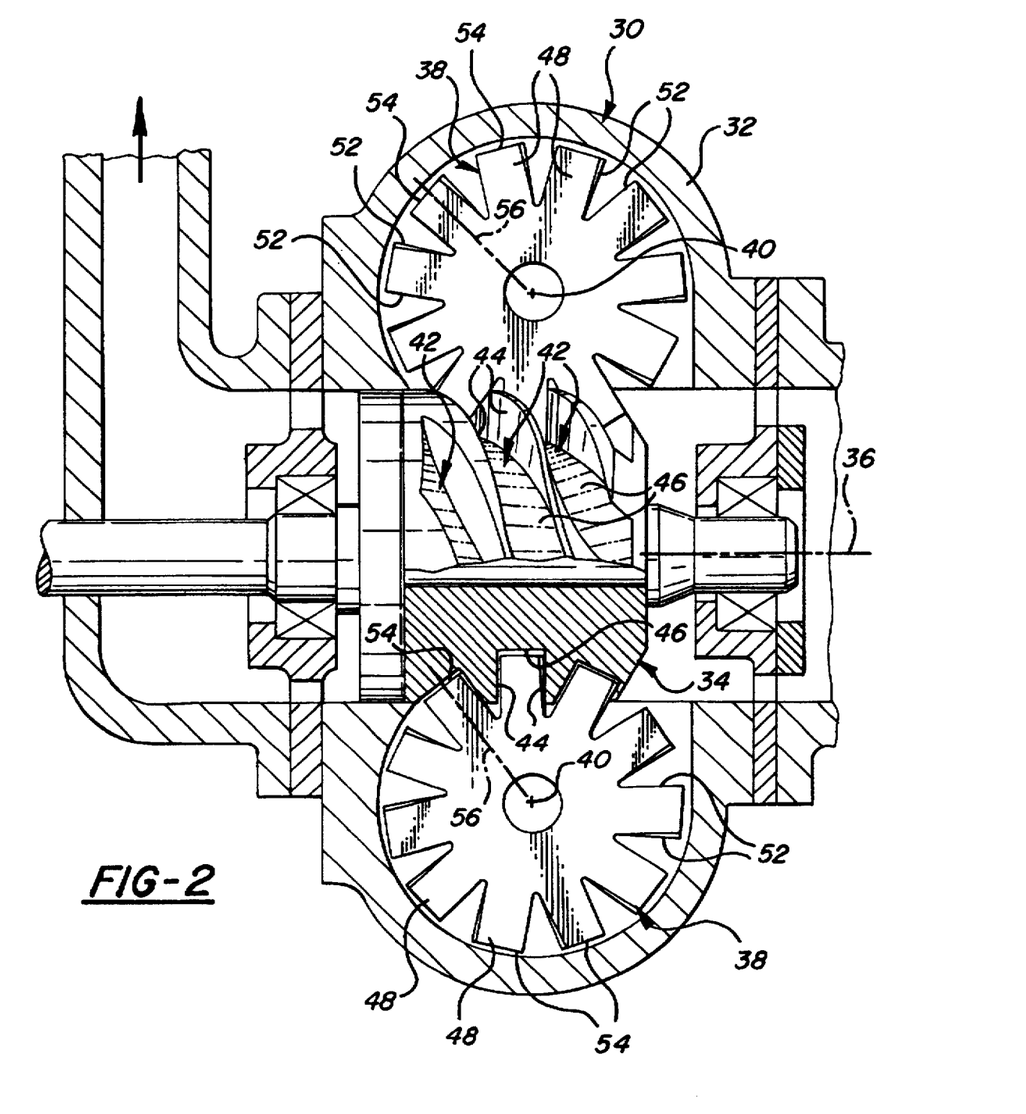
FIG. 2 is a top view, partly in section, of a single screw compressor embodying this invention.
Figure 3:
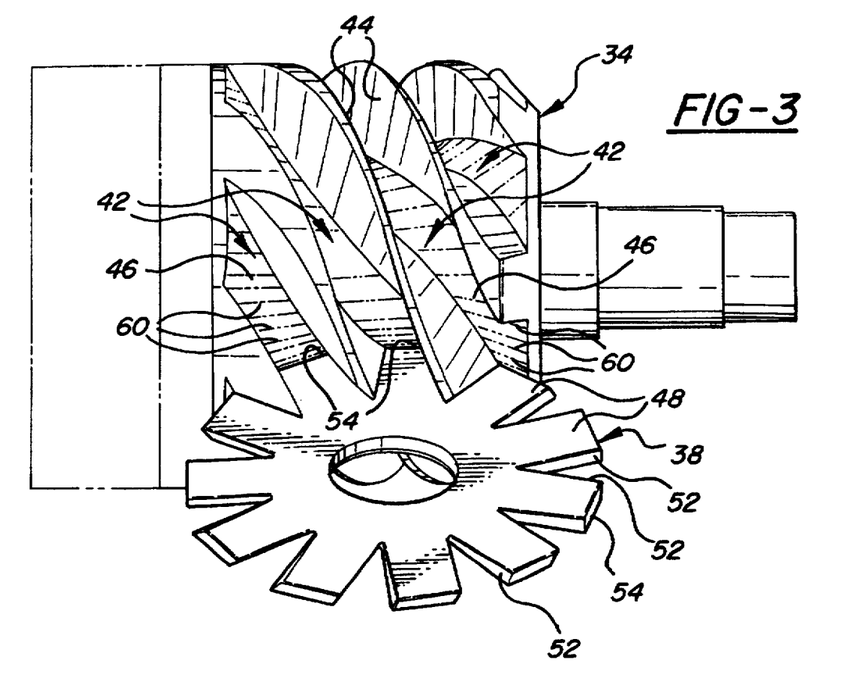
FIG. 3 is a pictorial view of several rotor components of the compressor of FIG. 2.
Figure 4:
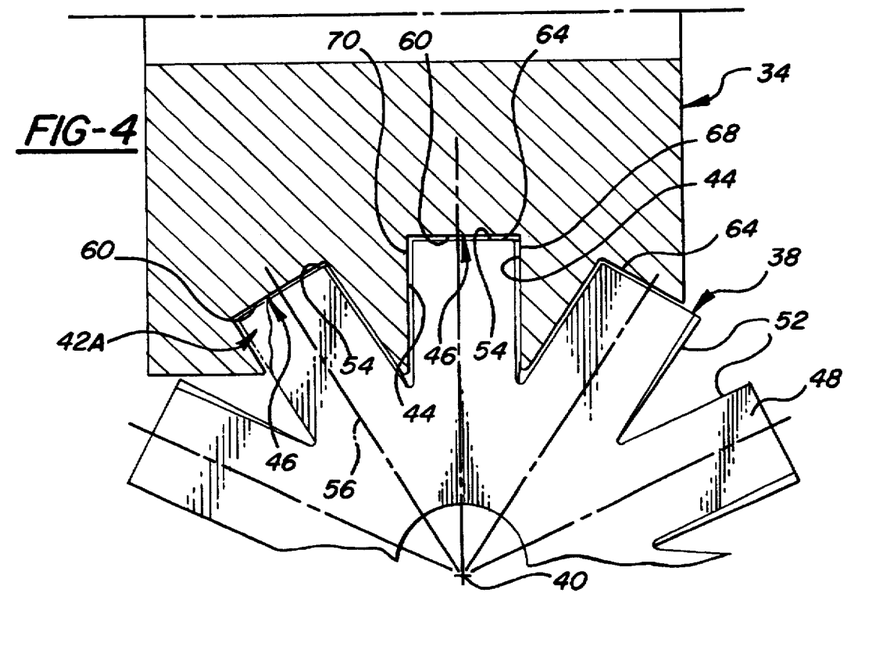
FIG. 4 is a diagrammatic view of this invention with parts broken away illustrating the intermeshing of a portion of the gate rotor teeth with flutes of the main rotor.
Figure 5:
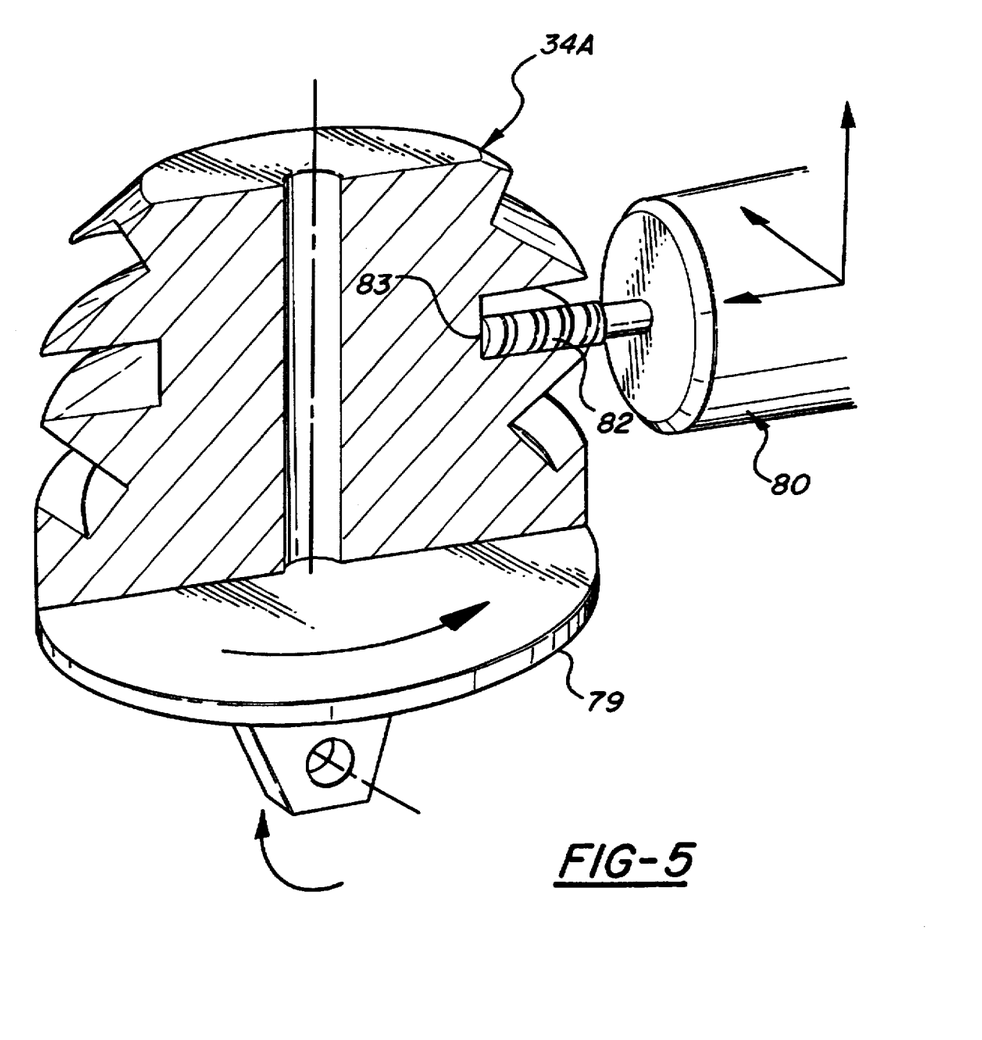
FIG. 5 is a pictorial view of a longitudinal section of the main rotor of FIGS. 2 through 4 being milled by an end mill.

One preferred embodiment of the present invention shown in FIGS. 2 through 4, is of the general category of the prior art referenced above. This embodiment comprises a compressor 30 having a housing 32 in which a main rotor 34 rotatable around a first axis 36 and a pair of gate rotors 38, operatively meshing with the main rotor for rotation around second axes 40, are operatively mounted.

Each of the second axes 40 of the gate rotors 38 is preferably perpendicular to the first axis 36 of the main rotor 34. However, the second axes 40 can be oriented in any way such that they are not perpendicular to the first axis 36 yet still be transverse to the first axis. Accordingly, transverse as far as the main and gate rotor axes are concerned is defined as any axes that are non-parallel. The main rotor 34 has a plurality of discrete flutes 42 milled or otherwise formed in the body thereof. Each of the flutes 42 is defined by two flanking sides 44 and a root 46 extending therebetween.

The gate rotors 38 have uniformly spaced teeth 48 that extend radially outward from the axes of rotation 40 and have side edges 52 which match the flanking sides 44 of the flutes 42. More importantly the teeth 48 terminate in predominantly flat or straight-line tips 54 which match the infinite number of ruling lines defining the straight line sealing segments 60 of the roots 46 of the flutes when in their operative intermeshing positions. The tips 54 are generally perpendicular to the longitudinal axes of the teeth thereof defined by radial lines 56 from the rotational center of the gate rotor.

The root 46 of each flute is the surface formed by an infinite number of ruling lines or straight line segments 60 that in effect represents the positions of the predominantly planar tips of the gate rotor teeth 48, as they fit into the flutes and move along an arcked-helical path through the main rotor 34. This type of surface is mathematically known as a ruled surface which may be defined as a straight ruling line moving through space along a predetermined path.

The descriptive term arcked-helical used in this specification to generally describe and explain the unique geometry of the flutes 42, is defined as follows: If the gate rotor teeth were to follow a linear path in their plane of rotation, that is, if the gate rotor 38 were of infinite radius, the result would be a helical path through the body of the rotating main rotor 34. However, since the gate rotor teeth 48 follow a circular path of a finite radius in their plane of rotation, the path through the main rotor 34 becomes modified by the circular motion of the gate rotor 38. This modified path resulting from the combined rotary motions of the main and gate rotors is a helix with an arc and is accordingly described as "arcked-helical". The arc of this modified path as shown in FIG. 4 has a center point corresponding to the rotational axis 40. The root 46 of a first flute 42A is formed by the ruling line 60 sweeping through its arcked-helical path while remaining generally perpendicular to the radial line 56 extending through the center point or rotational axis 40. As shown, the other flutes are similarly formed.

It will be appreciated that the roots 46 of the arcked-helical flutes 42 are engineered to have an infinite or continuous number of straight lined sealing surfaces or segments 60 for matching and close cooperation with the substantially flat tips of the gate rotor teeth extending across the roots 46 to improve the fluid sealing between the gate rotor teeth and the flutes of the main rotor and to provide a design for improving the manufacture of the rotors as is further discussed below.

On mutual rotation of the rotors, the teeth 48 of the gate rotors 38 intermesh with the main rotor flutes 42 and, as best shown in FIG. 4, create fluid seals between the three mating surfaces of the gate rotor teeth 48 and the main rotor flutes 42. More particularly, the predominantly flat tips 54 of the gate rotor teeth extend across and closely approach contact with the ruled surface of the roots 46 throughout their sweep of the flutes to form linear sealing areas 64. Since the surface of end of the roots 46 is ruled as described above, as the flat tip of an associated gate rotor tooth passes over the infinity of straight line sealing segments 60 of the root, a predominantly flat sealing section or area 64 continuously is formed therebetween.

The paths of the discrete flutes 42 extending in the main rotor 34 are in the described arcked-helical configuration. The roots 46 of each of the flutes 42 are milled or otherwise formed such that at any longitudinal section of the main rotor in the plane of the gate rotor 38, the root 46 will show a predominantly straight line profile and form the straight line segments 60 to provide the effective sealing areas 64 with the predominantly flat tips 54 of the gate rotor teeth.

Further, the straight line sealing segments 60, or the ruled surface, of the roots 46 are substantially perpendicular to the two flanks or sides 68, 70 of the flutes 42 as best shown in FIG. 4. Also, the sealing segments 60 of the roots 46 are predominantly perpendicular to the longitudinal axes or centerlines 56 of the mating gate rotor teeth 48. This mating of the gate rotor tooth tips and the surfaces of the root provide improved sealing since their straight line configurations can be readily held at close tolerance and the sealing areas 64 are substantially constant throughout the tooth sweep.

Figure 6A:
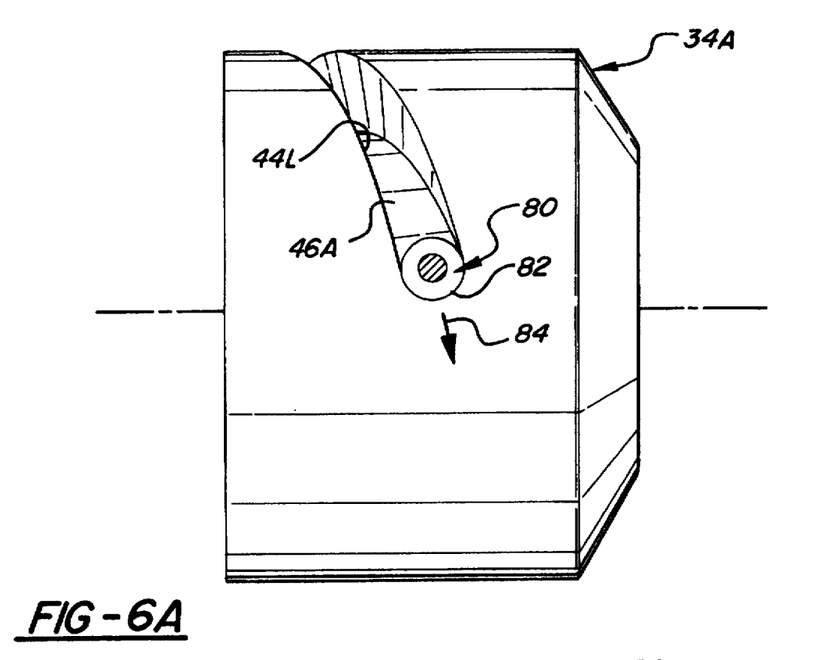
FIGS. 6A and 6B are pictorial views illustrating the manufacture of the main rotor of FIG. 2 with an end mill.

The main rotor 34 having arcked-helical flutes 42 and ruled surface roots 46 may be manufactured in the preferred processes employing an end mill. As shown in FIGS. 5 through 8, a blank or pre-processed main rotor 34A of a metal, engineered material or other suitable material is placed as a starting part on a rotatable work station 79 associated with an end milling machine 80 having a powered rotatable milling tool 82 with a flat end 83. The milling machine 80 is powered and moved along appropriate axes of motion illustrated in FIG. 5 so that the rotating milling tool resultantly makes a first milling pass 84 in a predetermined path into the material of the blank or pre-processed rotor 34A to mill one arcked-helical side flank 44 and at least one half 46A of the root of a first flute. The first pass is shown in FIG. 6A. In making the first and other passes, the ruled surface of the root is formed by the flat bottom of the end mill.

Figure 6B:
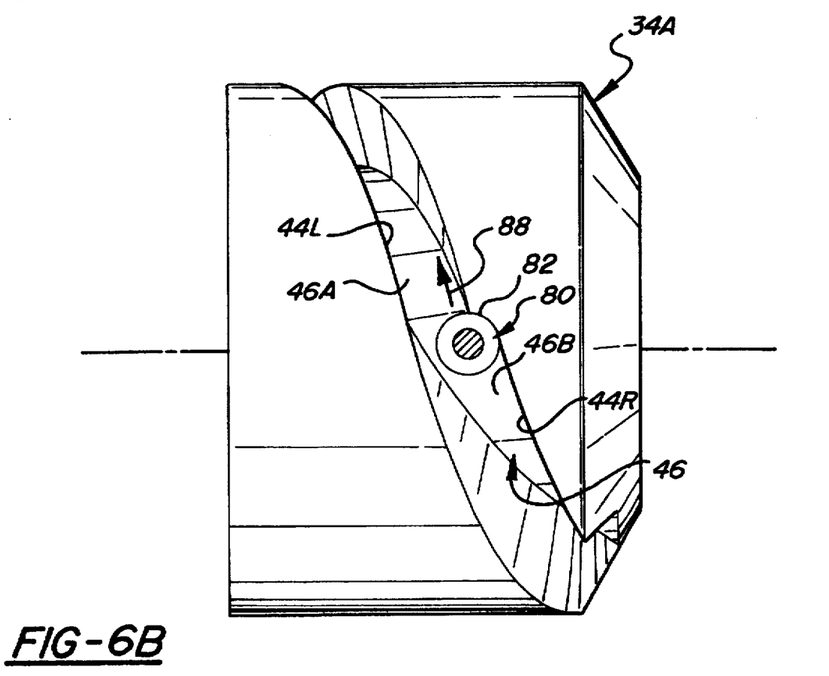

Subsequently, a second milling pass 88, such as shown in FIG. 6B, is made to mill the other side flank 44 and another portion of the root 46B. Accordingly, one flute with a ruled surface root 46 may be made in two milling passes. Following this procedure, subsequent passes of the milling machine are made to mill the remaining flutes 42 into the blank or preprocessed main rotor 34A to complete the main rotor.

Figure 7:
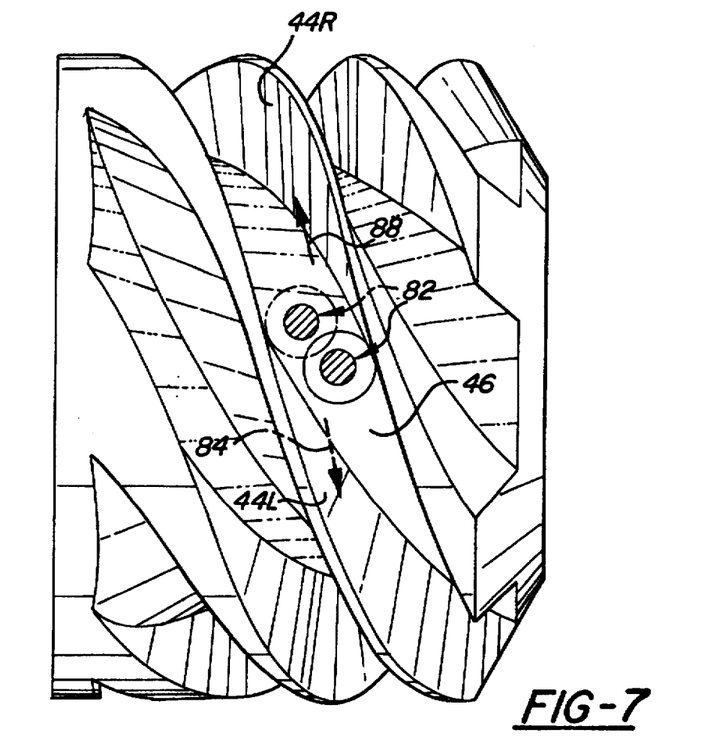
FIG. 7 is a pictorial view of the main rotor with a representation of the paths of the end mill tool during manufacture.

The paths 84, 88 of the milling tool 82 are shown more specifically in FIG. 7. The first tooling path 84 mills left flank 44L and a portion of the root 46. The second tooling path 88 mills the right flank 44R and another portion of the original root 46. The tooling paths of the milling tool 82 are preferably in opposite directions as illustrated so as to create a consistent cutting condition. However, milling with the same directional paths is possible.

Figure 8:
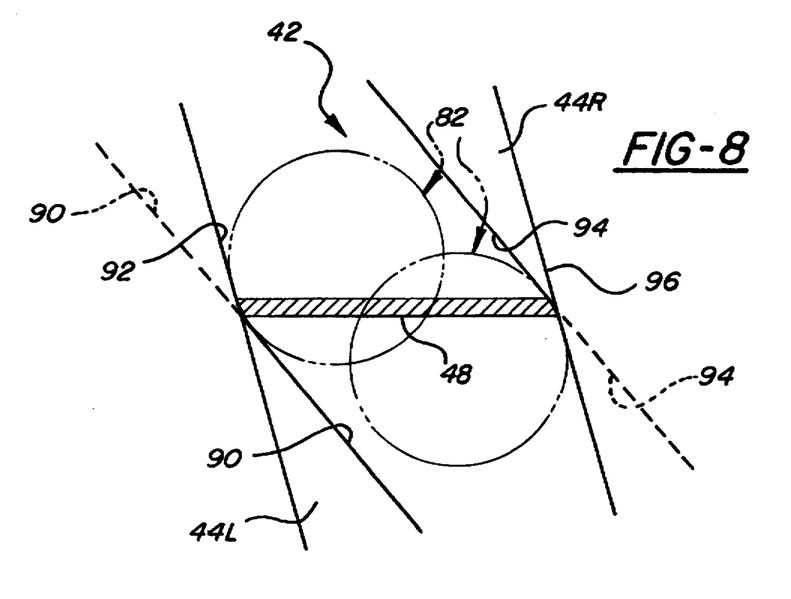
FIG. 8 is a diagrammatic view of the end mill tool paths within the flute of the main rotor for accommodating a flat tipped gate rotor tooth.

The paths of the milling tool 82 in milling a main rotor flute 42 are shown in FIG. 8. A left lower edge line 90 and a left top edge line 92 are the left-most boundaries of the flute 42. Together these two edge lines define the inner and outer limits of the left flank of the flute 42. A right lower edge line 94 and a right top edge line 96 are the right-most boundaries of the flute 42. Together these two edge lines define the inner and outer limits of the right flank of the flute 42. A gate rotor tooth 48 is shown as it would fit within the sides or flanks of the flute 42 at any single instant in time. This tooth is shown for reference purposes since it is not present during milling.

In a first milling tool path the rotating tool mills the left flank and a portion of the root. At any single moment during the first milling path the end milling tool is tangent to the left upper edge and the left lower edge lines. This allows the milling tool to create a left flank that is substantially perpendicular to the straight line segments 60 and provides a precision sealing surface with the sides of the gate rotor teeth.

In a second milling tool path the tool mills the right flank and another portion of the root. Preferably, the root is completed with the two passes although the root may be completely milled in a third pass. As with the first milling tool path, the second milling pass at any single moment is tangent to the right upper edge and the right lower edge lines. This allows the milling tool to create a right flank that is substantially perpendicular to the straight line rulings, or segments 60, of the root to provide the precision sealing surface with the tip and sides of the gate rotor tooth.

While preferred embodiments and manufacturing methods of the invention have been shown and described, other embodiments will now become apparent to those skilled in the art. Accordingly, this invention is not to be limited to that which is shown and described but by the following claims.

what is claimed is:

1. A main rotor for a rotary fluid machine comprising a body rotatable about a longitudinal axis of rotation with at least one fluid conducting flute therein, said flute having flanking side walls and a root surface therebetween, said root surface being a ruled surface defined by a ruling line sweeping in an arcked-helical path in said body with the arc thereof having a center spaced from said body, said ruling line remaining generally perpendicular to a radial line extending therefrom to said center as the ruling line sweeps through said body.

2. The main rotor of claim 1, wherein said ruling line is generally perpendicular to said flanking side walls of said flute as said ruling line sweeps through said body.

3. The main rotor of claim 1, wherein said main body has a plurality of equally spaced flutes therein substantially identical to said first recited flute.

4. A main rotor for a rotary fluid machine, comprising a body rotatable about a central axis, said body having a plurality of fluid conducting flutes therein for receiving said fluid, each of said flutes being an arcked-helical channel, each of said channels having a root surface defined by an infinite number of side-by-side rulings and having flanking side walls on opposite sides thereof, said root surface being predominantly linear in the planes radiating from the central axis of said body and being predominantly perpendicular with respect to said side walls.

5. In a rotary fluid machine for varying the volume of a fluid medium supplied thereto comprising a main rotor rotatable about a first axis, said main rotor being formed from a body having a plurality of fluid conducting flutes therein for receiving said fluid medium, each of said flutes being an arcked-helical channel defined by flanking side walls and a ruled root surface, a gate rotor rotatable about a second axis, said gate rotor having radially extending teeth which are arcuately spaced from one another operatively fitting into said flutes, each tooth in said gate rotor having a flattened tip substantially perpendicular to the longitudinal axis thereof and each being in successively fluid sealing relationship with the flutes as the main rotor and gate rotor rotate about their axes so that the operating volumes of said flutes are progressively changed to move the fluid medium through said flutes as the main and gate rotors rotate, said root surfaces being predominantly linear in the sealing regions established between said tips of said teeth and said roots of said flutes as said teeth sweep through said flutes to force said fluid medium therethrough.

6. The machine of claim 5, wherein the gate rotor teeth terminate in tips that are predominantly planar and cooperate with said roots of said main rotor flutes to establish the linear fluid seals therebetween.

7. The machine of claim 5, wherein said ruled root surfaces of said main rotor flutes match said predominantly planar tips of said teeth of said gate rotor.

8. In a rotary fluid machine for varying the volume of a fluid medium supplied thereto having a main rotor rotatable about a first axis, said main rotor being formed from a body having a plurality of arcked-helical fluid conducting flutes extending therein, each of said flutes being defined by a root and flanking side walls, a gate rotor rotatable about a second axis transverse to said first axis, said gate rotor having radially extending teeth which are arcuately spaced from one another for fitting into said flutes, each tooth in said gate rotor being in successively fluid sealing relationship with the flutes as the main rotor and gate rotor rotate about their axes so that the operating volumes of said flutes are progressively changed to accordingly vary the volume of the fluid medium in said flutes as the main and gate rotors rotate about their respective axes, said gate rotor teeth having ends that are predominantly planar and perpendicular to the longitudinal axes thereof and said root of each of said flutes cooperating with the tips of said gate rotor teeth to establish an infinite number of substantially straight line sealing regions as said tips sweep through said flutes of said main rotor.

9. In a rotary fluid machine for varying the volume of a fluid medium fed thereto having a main rotor rotatable about a first axis, said main rotor being formed from a body having a plurality of spaced arcked-helical flutes therein, each of said flutes being formed with a root surface and flanking side walls extending without interruption around said first axis, a gate rotor rotatable about a second axis, said gate rotor having radially extending teeth with flattened and generally straight tips which are generally perpendicular to the longitudinal axes thereof and which are arcuately spaced from one another for operatively fitting into said flutes to establish progressively changing fluid operating volumes therein in response to the rotary motion of said main rotor about said first axis and the rotary motion of said gate rotor about said second axis, each tooth in said gate rotor being in successively fluid sealing relationship with the flutes of said main rotor with substantially constant straight-line fluid sealing regions being established between said tips and said root surfaces as said main rotor and said gate rotor rotate about their respective axes.

* * * * *